(No Model.)
E. G. PHILLIPS.
HINGE.
No. 424,900. Patented Apr. 1, 1890.
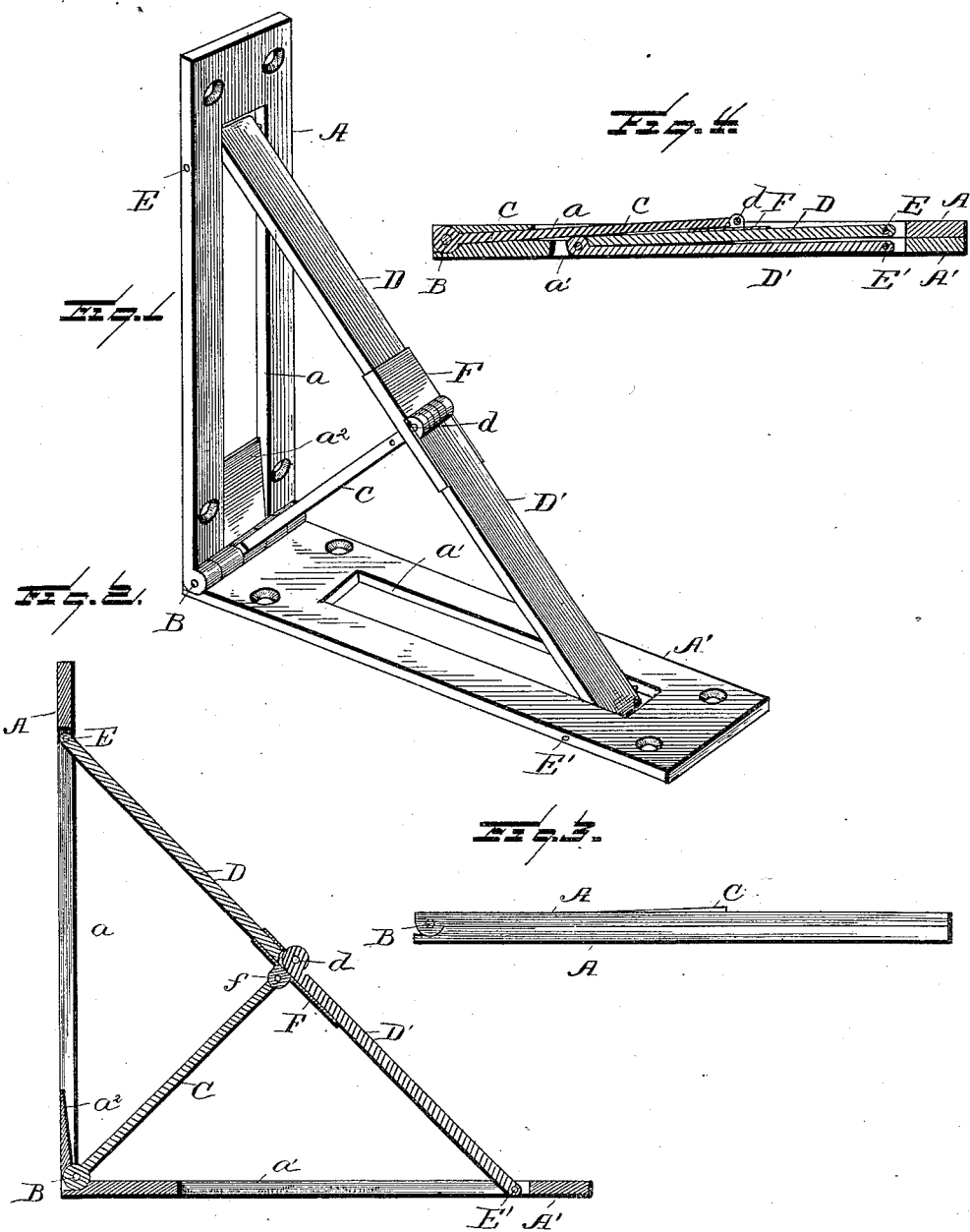
Witnesses
E. C. Wurdeman
Inventor
Edwin G. Phillips
By his Attorneys,
C. A. Snow & Co.

UNITED STATES PATENT OFFICE.

EDWIN G. PHILLIPS, OF CHARLESTON, SOUTH CAROLINA, ASSIGNOR OF TWO-THIRDS TO SAMUEL WEISKOFF AND THOMAS P. LIVINGSTON, OF SAME PLACE.

HINGE.

SPECIFICATION forming part of Letters Patent No. 424,900, dated April 1, 1890.

Application filed May 31, 1889. Serial No. 312,765. (No model.)

*To all whom it may concern:*

Be it known that I, EDWIN G. PHILLIPS, a citizen of the United States, residing at Charleston, in the county of Charleston and State of South Carolina, have invented a new and useful Hinge, of which the following is a specification.

The invention relates to improvements in hinges.

The object of the present invention is to provide for tables, brackets, and the like a hinge which will be braced when open and which will when closed fold the brace compactly within its leaves.

The invention consists in the construction and the novel combination and arrangement of parts, hereinafter fully described, illustrated in the accompanying drawings, and pointed out in the claims hereto appended.

In the drawings, Figure 1 is a perspective view of a hinge constructed in accordance with the invention, the leaves being open and braced. Fig. 2 is a side elevation, the parts being folded together. Fig. 3 is a central longitudinal sectional view of the parts, being in the position shown in Fig. 1. Fig. 4 is a similar view showing the parts folded as in Fig. 2.

Referring to the accompanying drawings, A and A' designate the leaves of a hinge which is constructed of suitable material and is designed to be employed on tables, brackets, pianos, and the like, or any place where it is desirable to use a hinge whose leaves may be spread and prevented closing. The leaves A and A' are hinged together by a pintle B, which also pivots a central brace C, and the said leaves A and A' are provided with longitudinal slots $a$ and $a'$ to receive the central brace C and front braces D and D' and allow the inner faces of the leaves A and A' to be close together when the hinge is closed and the parts to be folded compactly together. The lower end of the leaf A is provided with a groove $a^2$, which forms a continuation of the slot $a$ and has an inclined bottom and adapts the slot $a$ to receive the central brace C. The inner meeting ends of the front braces D and D' are hinged together by a pintle $d$, while their outer ends are pivoted in the outer ends of the longitudinal slots by pins E and E'. When the leaves A and A' are open, the braces D and D' form a straight brace between the leaves and prevent the latter closing. The braces D and D' are maintained in a straight line and prevented closing in by the central brace, which has its outer end pivoted to an ear $f$, depending from a collar F, which slides upon the brace D and has a portion of its upper face cut away in order to allow the central brace to lie directly under the pintle $d$.

From the foregoing description and the accompanying drawings the construction, operation, and advantages of the invention will readily be understood.

What I claim is—

1. The combination of the hinge-leaves having longitudinal slots, and the front braces hinged together and pivoted in the outer ends of the slots and provided with a sliding collar to embrace the hinge of the braces, as set forth.

2. The combination of the hinge having the longitudinal slots in its leaves, one of said leaves being provided with a groove forming a continuation of the longitudinal slot, the central brace hinged to the inner ends of the leaves, and the front braces hinged together and pivoted in the outer ends of the said slots, said central brace having a sliding connection with the front brace, substantially as described.

3. The combination of the hinge, the central brace pivoted to the inner ends of the leaves, and the front braces hinged together and pivoted to the outer ends of the leaves, said braces being adapted to fold within the hinge, substantially as described.

4. The combination of the hinge, the central brace hinged to the inner ends of the leaves, the front braces, and the collar sliding upon the front braces and pivoted to the outer end of the central brace, substantially as described.

5. The combination of the hinge having its leaves provided with longitudinal slots $a$ and $a'$ and the groove $a^2$, forming a continuation of the slot $a$, the central brace C, hinged to the inner ends of the leaves by the pintle thereof, the front braces hinged together and pivoted in the outer end of said slots $a$ and $a'$, and the collar sliding upon one of the braces and pivotally connected to the end of the central brace, substantially as described.

In testimony that I claim the foregoing as my own I have hereto affixed my signature in presence of two witnesses.

EDWIN G. PHILLIPS.

Witnesses:
 G. F. HEDRICH,
 JAMES B. EVANS.